(12) United States Patent
Jacobs et al.

(10) Patent No.: US 8,863,987 B2
(45) Date of Patent: Oct. 21, 2014

(54) BEVERAGE APPARATUS WASTE BIN LEVEL DETECTION

(71) Applicant: Keurig, Incorporated, Reading, MA (US)

(72) Inventors: William T. Jacobs, Lynnfield, MA (US); Paolino Carnevale, Raynham, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 0 days.

(21) Appl. No.: 13/795,698

(22) Filed: Mar. 12, 2013

(65) Prior Publication Data

US 2014/0263432 A1    Sep. 18, 2014

(51) Int. Cl.
*B67D 1/16* (2006.01)
*B67D 7/32* (2010.01)

(52) U.S. Cl.
CPC .................................. *B67D 7/3209* (2013.01)
USPC ................... 222/108; 222/1; 222/64; 222/56; 99/306

(58) Field of Classification Search
CPC ........... A47J 31/46; A47J 31/54; A47J 31/10; A47J 31/0573; A47J 31/545; A47J 31/4475; A47J 31/3623; A47J 31/56; A47J 31/402; A47J 2203/00; A47J 31/4457; A47J 31/36; A47G 19/145
USPC ............. 222/65, 40, 108, 109, 111, 1, 56, 64, 222/66, 52; 99/300, 295, 311, 280, 302 R, 99/305–309; 426/431
See application file for complete search history.

(56) References Cited

U.S. PATENT DOCUMENTS

| | | | |
|---|---|---|---|
| 2,898,954 A | | 8/1959 | Freeman |
| 3,273,392 A | * | 9/1966 | Olsen .............................. 73/295 |
| 4,814,752 A | | 3/1989 | Lehman |
| 5,889,684 A | | 3/1999 | Ben-David et al. |

(Continued)

FOREIGN PATENT DOCUMENTS

| | | | |
|---|---|---|---|
| DE | 102010023668 A1 | 12/2010 | |
| DE | 102010023668 | * 12/2012 | .............. A47J 31/44 |

(Continued)

OTHER PUBLICATIONS

International Search Report and Written Opinion from corresponding PCT Application No. PCT/US2014/020477 dated Jun. 24, 2014.

*Primary Examiner* — Frederick C Nicolas
*Assistant Examiner* — Bob Zadeh
(74) *Attorney, Agent, or Firm* — Wolf, Greenfield & Sacks, P.C.

(57) ABSTRACT

A beverage forming method and system in which a waste bin arranged to collect leaked or spilled liquid has a liquid level sensor and can be removed from the beverage forming machine, e.g., to allow disposal of the waste bin contents. One or more electrical contacts on the waste bin can be connected to the level sensor and electrically connect to control circuitry of the beverage forming machine when the waste bin is received by the machine. A liquid level detected by the level sensor may correspond to a fill level that is far less than the maximum volume of the waste bin, allowing beverage production to be prevented unless the waste bin can collect the full volume of a beverage dispensed.

16 Claims, 6 Drawing Sheets

(56) References Cited

U.S. PATENT DOCUMENTS

| | | | |
|---|---|---|---|
| 6,679,400 B1 | 1/2004 | Goodman | |
| 7,093,533 B2 * | 8/2006 | Tebo et al. | 99/315 |
| 7,228,066 B2 * | 6/2007 | Pope | 392/441 |
| 7,293,458 B2 * | 11/2007 | Ramus et al. | 73/304 R |
| 7,360,418 B2 * | 4/2008 | Pelovitz | 73/304 C |
| 7,640,845 B2 * | 1/2010 | Woodnorth et al. | 99/300 |
| 8,151,694 B2 * | 4/2012 | Jacobs et al. | 99/302 R |
| 2006/0254428 A1 | 11/2006 | Glucksman et al. | |
| 2009/0266442 A1 | 10/2009 | Duscher et al. | |
| 2011/0070348 A1 * | 3/2011 | Burton-Wilcock et al. | 426/431 |

FOREIGN PATENT DOCUMENTS

| | | |
|---|---|---|
| EP | 2441361 A1 | 4/2012 |
| GB | 2066796 A | 7/1981 |
| GB | 2449630 A | 12/2008 |

* cited by examiner

BEVERAGE APPARATUS WASTE BIN LEVEL DETECTION

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. In many such systems, there is a capability to collect spilled beverage, e.g., that misses a user's cup. For example, U.S. Pat. No. 5,889,684 discloses a beverage machine that can make a beverage and collects any spilled beverage in a drip tray. The machine will also detect whether the drip tray is full and prevents beverage production if the tray is full.

SUMMARY OF INVENTION

In some embodiments, a beverage forming apparatus may be arranged to collect waste liquid whether dispensed from a dispense outlet and failed to be collected in a user's cup, or leaked from a beverage forming station, e.g., in case of a failed beverage cartridge. In addition, a waste bin used to collect the waste liquid may be removable from the beverage machine, yet have a liquid level sensor that can electrically communicate with the machine controller when the waste bin is associated with the machine. For example, the waste bin may include one or more electrically conductive contacts that electrically connect with conductive contacts on the beverage machine housing when the waste bin is placed at a waste bin receiving area. This electrical connection may allow the liquid sensor of the waste bin to communicate with the beverage machine controller, e.g., to send a signal indicative of a liquid level in the waste bin. Depending on the liquid level in the waste bin, the control circuit may permit or prevent beverage formation. In some embodiments, the control circuit may prevent beverage formation unless the waste bin has an empty volume that exceeds a volume of beverage to be made by the machine. This way, even if a malfunction or other error occurs, the waste bin may be capable of collecting the entire volume of beverage produced (or at least a large portion of the beverage produced), thereby preventing spilling of beverage into the machine housing or onto a countertop or other support on which the machine is placed.

In one aspect of the invention, a beverage forming apparatus includes a housing to support components of the beverage forming apparatus and a waste bin receiving area at which a waste bin may be located. A beverage forming station may be supported by the housing and arranged to combine a precursor liquid with a beverage material to form a beverage that is dispensed from a dispense outlet at a dispense area. For example, the beverage forming station may include a cartridge holder arranged to receive and hold a beverage cartridge that contains a beverage material which is mixed with liquid to form a beverage. A precursor liquid supply system may be supported by the housing and provide precursor liquid to the beverage forming station such that the liquid may be mixed with the beverage material to form a beverage that is dispensed at the dispense outlet. The liquid supply system may include components such as a liquid conditioner that conditions the liquid, e.g., by heating, cooling, carbonating and/or otherwise acting on the liquid in some way in preparation for forming a beverage. The waste bin may be arranged to collect waste liquid at the dispense area or waste liquid released from the beverage forming station by portions other than the dispense outlet. For example, the waste bin may be arranged as a drip tray to collect spilled liquid under a beverage dispense outlet and/or arranged to collect leaking or otherwise released liquid from other portions of the machine. In one embodiment, the waste bin may be arranged to collect liquid that leaks from the beverage forming station due to the non-presence of a cartridge and/or failure of a seal or other component.

The waste bin may include a liquid level sensor to detect a liquid level in the waste bin and at least one electrically conductive contact arranged to connect with a corresponding housing contact when the waste bin is positioned at the waste bin receiving area. The waste bin may be removable from the waste bin receiving area of the housing, e.g., the at least one electrically conductive contact may disconnect from the housing contact when the waste bin is removed from the waste bin receiving area, and may reconnect upon re-placement of the waste bin at the waste bin receiving area. A control circuit may be arranged to control the liquid supply system to deliver precursor liquid to the beverage forming station to dispense a beverage only when a signal received from the liquid level sensor via the at least one electrically conductive contact indicates that a liquid level in the waste bin is below a threshold level. Thus, the machine may be controlled to produce beverage only if the waste bin has capacity to collect liquid spilled or leaked during beverage production.

In one embodiment, the housing of the beverage forming machine has a front side at which the dispense area is located, e.g., where a carafe or other container can be positioned to collect beverage dispensed from the dispense outlet. The waste bin receiving area may be located behind the dispense area, e.g., so that a carafe or other container must be removed from the dispense area to allow the waste bin to be removed from the waste bin receiving area. Both the dispense area and the waste bin receiving area may be located below the beverage forming station, e.g., to allow beverage dispensed from the dispense outlet and/or any liquid released from the beverage forming station to flow by gravity to a carafe at the dispense area or to the waste bin.

In one embodiment, the at least one electrically conductive contact of the waste bin includes a pair of electrically conductive contacts that are electrically insulated from each other. For example, the conductive contacts may include metal pins that are mounted to (e.g., co-molded with) a plastic body of the waste bin. The liquid level sensor may include a pair of conductive probes that are each connected to a respective electrically conductive contact and are arranged to contact liquid in the waste bin. For example, the metal pins of the conductive contacts may extend through the wall of the waste bin so that portions of the pins are exposed at the interior of the waste bin for contact with liquid in the bin. Accordingly, the conductive probes may be arranged to contact liquid in the waste bin and provide an electrical signal to the control circuit via the electrically conductive contacts. Of course, other arrangements for the liquid level sensor are possible, such as one or more float switches, capacitive sensors, optical detectors (e.g., LED and photodiode), pressure sensors, weight sensors (e.g., a load cell), and others.

In some embodiments, the waste bin may have a total volume capable of holding a volume of liquid and the liquid level sensor may be arranged to detect a liquid level in the waste bin that corresponds to a fill volume of the waste bin that is less than the total volume by an amount equal to or greater than a maximum beverage dispense volume of the apparatus. In this way, the liquid level sensor may allow the control circuit of the beverage forming machine to detect whether the waste bin has capacity to collect a volume of beverage to be produced in a next hypothetical cycle, and prevent machine operation if the waste bin does not have the capacity to receive the full beverage volume. As a result, the machine may be operated so that in the case of a leak or other problem, liquid can be collected by the waste bin and prevented from entering the housing or spilling onto a countertop or floor.

In another aspect of the invention, a method for controlling a beverage forming apparatus includes providing a beverage forming apparatus having a waste bin that is removable from a beverage forming machine housing. With the waste bin received by the housing, the waste bin may have at least one electrically conductive contact in connection with a corresponding housing contact, e.g., to allow a liquid level sensor of the waste bin to communicate with a control circuit of the beverage forming machine. A fill volume of liquid in the waste bin may be detected to be equal to or greater than a threshold volume (or not) based on a signal received via the at least one electrically conductive contact, and operation of the beverage forming apparatus to dispense a beverage may be prevented if the fill volume is detected to be greater than or equal to the threshold volume. Since the waste bin may be removable from the beverage forming machine, removal of the waste bin from the housing may disconnect the at least one electrically conductive contact from the housing contact. Reconnection of the electrically conductive contact on the waste bin with the housing contact may be established by re-placing the waste bin at a waste bin receiving area of the beverage forming machine.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
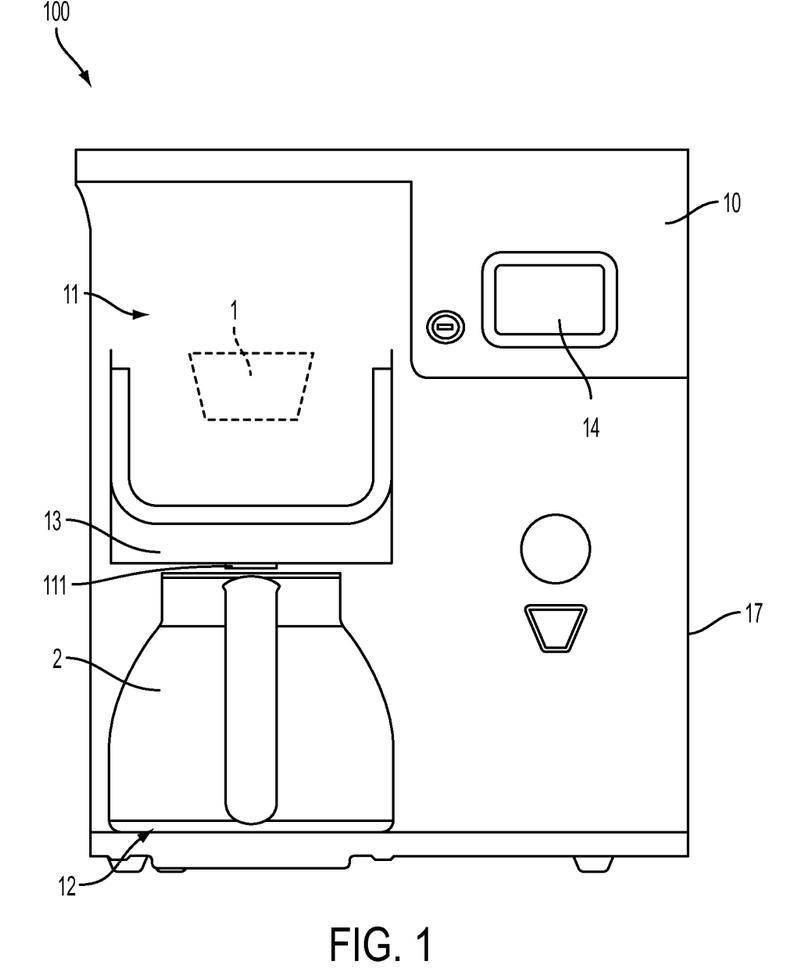
FIG. 1 is a front view of a beverage forming apparatus with a carafe located at a carafe receiving area of a beverage forming machine in an illustrative embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage.) If used, the cartridge 1 may be manually or automatically placed in a beverage forming station 11 of a beverage forming machine 10. For example, the beverage forming station 11 may include a cartridge holder that is exposed to receive the cartridge 1 when the user operates a handle or other actuator. With the cartridge 1 placed in the cartridge holder, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

In this embodiment, the beverage forming machine 10 includes a housing 17 that houses and/or supports components of the machine 10, such as a user interface 14 used to control system operation, and defines a carafe receiving area 12 at which the carafe 2 is positionable to receive beverage dispensed by the machine 10 via a dispense outlet 111. Thus, at the carafe receiving area 12, the carafe 2 is associated with the machine 10 to receive a dispensed beverage and may be supported by the housing 17. The carafe 2 may be received at the carafe receiving area 12 so that the carafe 2 is at least partially surrounded by the housing 17, or the carafe 2 may be more exposed when at the carafe receiving area 12. The apparatus 100 may include a carafe lid detector 13 that is arranged to detect whether a lid that covers the beverage opening of the carafe 2 is in an open position or a closed position. For example, the lid detector 13 may include a camera or other imaging device that images a portion of the carafe 2 and uses image analysis to determine whether a lid of the carafe is in an open or closed position. In other arrangements, any suitable sensors may be used to detect a lid's presence, such as magnetic, inductive, resistive, capacitive or other sensors used to detect a magnetic or other physical characteristic of a lid. In some embodiments, the beverage forming machine 10 may be controlled to dispense beverage from the dispense outlet 111 only if the carafe 2 is detected to have its lid in the open position. However, the machine 10 need not necessarily have a lid detector 13, and instead may make beverage whether the carafe 2 is suitably positioned at the carafe receiving area 12 or not.

Figure 2:
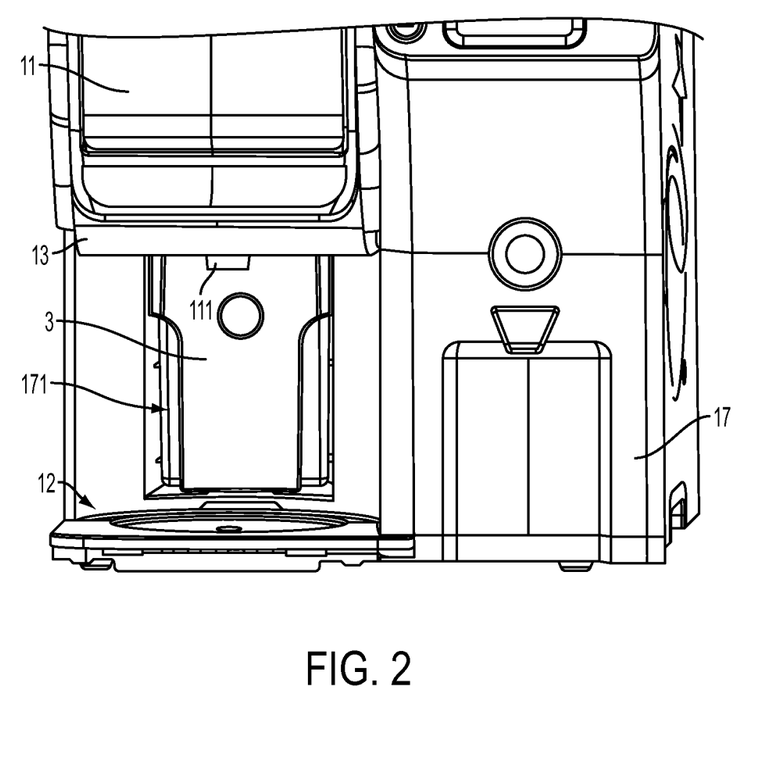
FIG. 2 is front view of the FIG. 1 embodiment with a carafe removed from the carafe receiving area.

In accordance with an aspect of the invention, a waste bin arranged to collect waste liquid may be positioned behind the carafe receiving area and located in a cavity of the beverage forming machine housing. For example, FIG. 2 shows the FIG. 1 embodiment with the carafe 2 removed from the carafe receiving area 12. With the carafe removed, the waste bin 3 can be seen positioned in the waste bin receiving area 171. In this embodiment, the waste bin receiving area 171 is located at a cavity formed in the machine housing 17, but may be arranged in other ways. For example, the waste bin receiving area 171 may be located at an exposed side of the housing 17 or at other locations.

In accordance with another aspect of the invention, the waste bin may be arranged to collect waste liquid that is expelled from the beverage forming station via one or more portions or pathways other than a beverage dispense outlet. For example, the beverage forming station 11 may be arranged to produce a beverage by mixing liquid with a beverage material contained in a cartridge 1 and directing the beverage to the dispense outlet 111. However, if a cartridge 1 is not associated with the beverage forming station 11, liquid may leak from one or more portions of the forming station 11 instead of being delivered to the dispensing outlet 111. (For example, in such a system, the cartridge 1 may form part of a liquid flow path, and when omitted, may cause the system to leak.) In such a case, the waste bin 3 may collect liquid that leaks from the beverage forming station 11. In another example, a part failure or other problem may cause the beverage forming station 11 to leak liquid via one or more paths other than the dispense outlet 111. Again, the waste bin 3 may collect liquid from such leaks, preventing liquid from being deposited into the housing 17 or flowing from the machine 10.

Although not shown in FIG. 2, the waste bin could alternately, or additionally, be arranged to function as a standard drip tray to collect liquid dispensed from the dispense outlet 111. For example, in some arrangements, a user may command the machine 10 to make a beverage without placing the carafe 2 or other container to collect beverage dispensed from the outlet 111. In this case, the waste bin 3 could be arranged to collect liquid dispensed from the outlet 111, again preventing spilling of the beverage from the machine 10.

Figure 3:
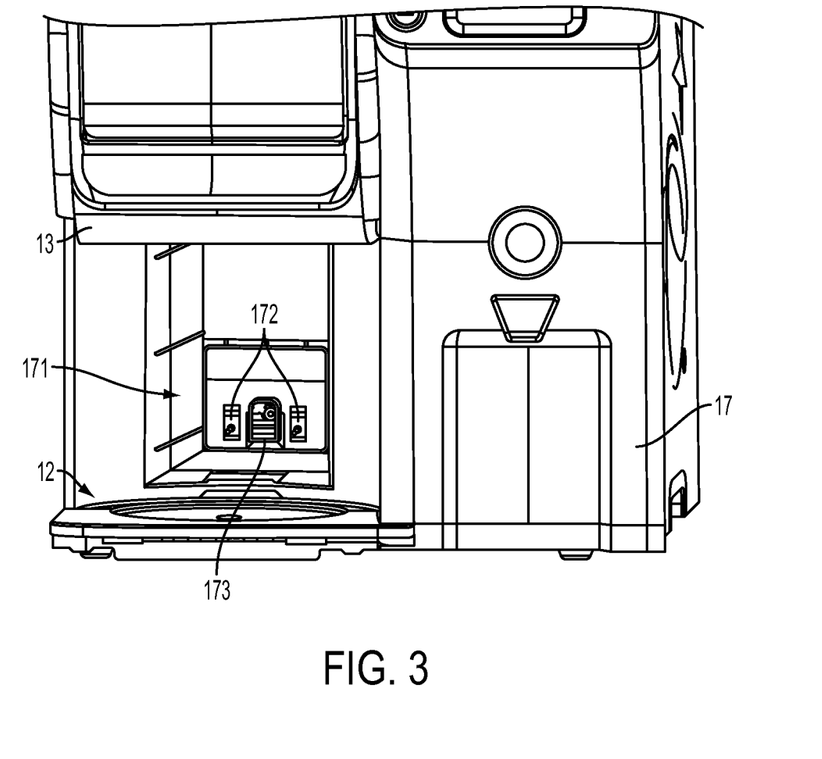
FIG. 3 is a front view of the FIG. 1 embodiment with a waste bin removed from the waste bin receiving area.

Regardless of how the waste bin 3 is arranged to collect waste liquid, the waste bin 3 may be arranged with a liquid level sensor to provide a signal indicative of a fill level in the waste bin 3 yet still be removable from the machine 10. For example, one or more electrical contacts on the waste bin 3 may be arranged to allow disconnection of the liquid level sensor from the machine 10 (e.g., when the waste bin 3 is removed to empty the bin 3) and reconnection of the liquid level sensor with the machine controller when the waste bin 3 is re-placed at the waste bin receiving area. FIG. 3 shows the FIG. 1 embodiment with the waste bin 3 removed from the waste bin receiving area 171. With the waste bin 3 out of the way, a pair of electrical contacts 172 can be seen located in the waste bin receiving area 171 along with a waste bin retainer 173. As is discussed in more detail below, the housing contacts 172 are arranged to electrically connect with respective contacts on the waste bin 3 so that the machine controller can be connected to the liquid level sensor of the waste bin 3. The waste bin retainer 173 may hold the waste bin 3 in place in the waste bin receiving area 171, helping to maintain an electrical connection between the contacts 172 and respective contacts on the waste bin 3. The retainer 173 may be arranged in any suitable way, such as including a magnet that attracts a corresponding magnet or metallic element on the waste bin 3, a spring element that resiliently engages with a tab or other feature on the waste bin 3, a barb or bayonet feature that removably engages with a corresponding receiving feature on the waste bin, a hook-and-loop fastener element, a snap or button, and others. Also, the presence of the waste bin 3 may be detected by, for example, a magnet and reed switch, a mechanical switch, or in other ways. System operation to produce a beverage may be prevented unless the bin 3 is detected to be present at the receiving area 171.

Figure 4:
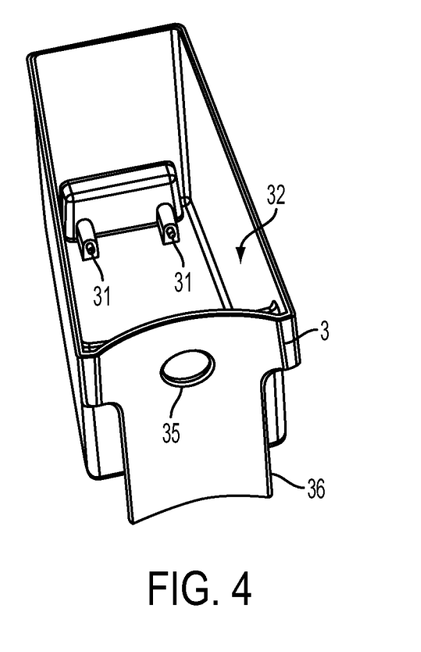
FIG. 4 is a top front perspective view of a waste bin in an illustrative embodiment.
Figure 5:
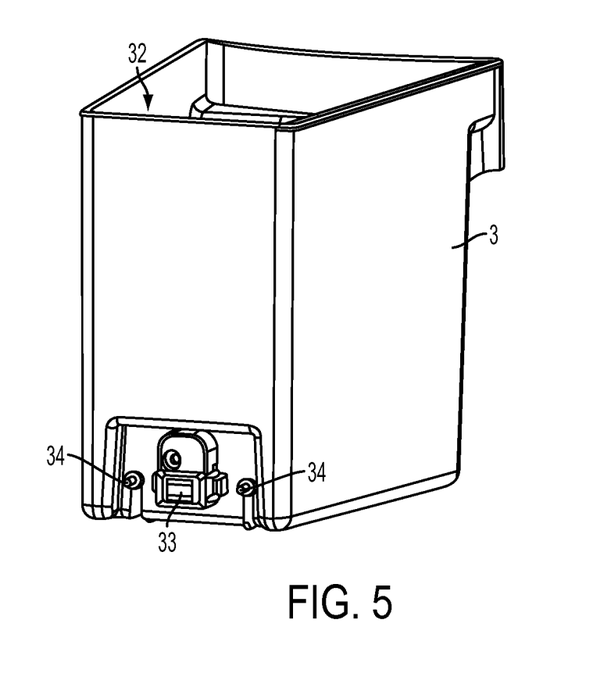
FIG. 5 is a rear perspective view of the waste bin in the FIG. 4 embodiment.
Figure 6:
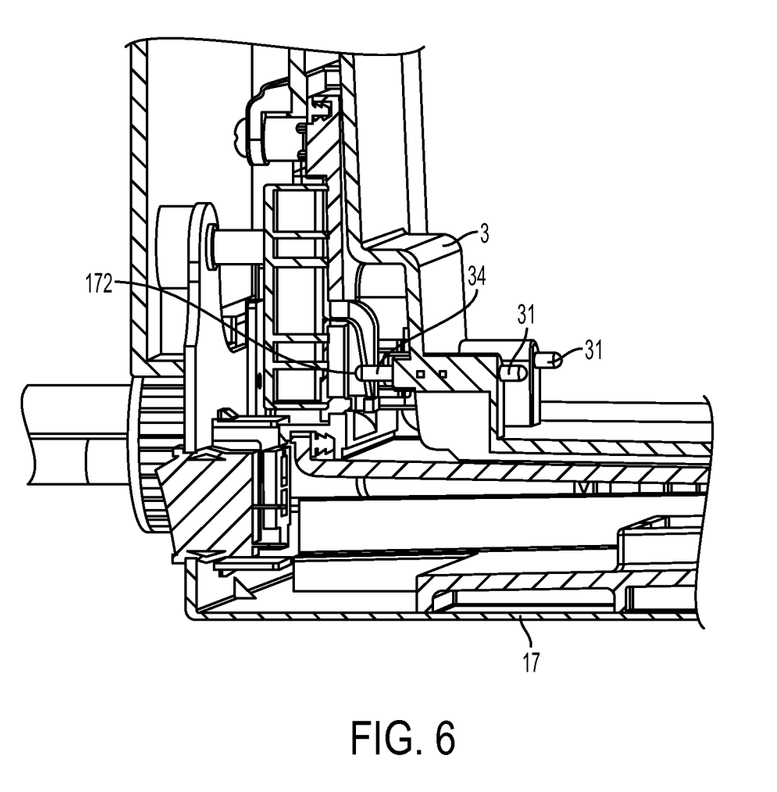
FIG. 6 is a close up sectional view of a rear portion of the waste bin at the waste bin receiving area of the FIGS. 1-5 embodiment.

FIGS. 4 and 5 show front and rear perspective views of the waste bin 3 in this illustrative embodiment. As can be seen in FIG. 4, the waste bin 3 includes an interior space or volume 32 arranged to collect and hold a volume of liquid. The waste bin 3 may also include a handle or other feature to help a user remove the waste bin 3 from the waste bin receiving area 171, such as a finger loop 35 and/or molded handle 36 as shown. In this embodiment, the liquid level sensor includes a pair of conductive probes 31 arranged near a bottom of the bin 3 that are each electrically connected to a corresponding electrical contact 34 located on a rear side of the waste bin 3 (see FIG. 5). The waste bin contacts 34 electrically connect with the respective contacts 172 of the beverage forming machine 10 when the waste bin 3 is positioned at the waste bin receiving area 171, e.g., as shown in FIG. 6. The waste bin 3 also includes a retainer 33 that engages with the waste bin retainer 173 of the machine 10 to hold the waste bin 3 in place in the waste bin receiving area 171. In this embodiment, the retainer 33 includes a channel or U-shaped spring element that has its legs extending toward the retainer 173 of the machine 10 when the waste bin 3 is at the waste bin receiving area 171. The spring element of the retainer 33 engages with a corresponding barb or bayonet feature that fits between, and is resiliently held by, the legs of the spring element to keep the waste bin 3 in place. At or near the retainer 33, the machine 10 may include a waste bin presence sensor, such as a reed switch that is closed when a magnet mounted on the waste bin 3 is suitably near (e.g., the bin 3 is properly placed at the receiving area 171).

In accordance with one aspect of the invention, the liquid level sensor of the waste bin may be arranged to detect a fill level of the waste bin that is less than a total volume of the waste bin, e.g., by an amount equal to or greater than a maximum volume of beverage produced by the beverage machine 10 in a beverage cycle. For example, in this embodiment, the conductive probes 31 of the liquid level sensor may be arranged a relatively short distance above the bottom of the waste bin bottom, e.g., about 1 inch or less. In contrast, the waste bin sidewalls may extend upwardly 4, 5, 6 inches or more from the bottom and be arranged to hold a total volume that greatly exceeds the fill volume when a liquid level in the waste bin first reaches the conductive probes 31. As a result, the conductive probes 31 may provide a signal to the machine controller that is indicative of a fill volume in the waste bin that approximately corresponds to the liquid level being at the height of the conductive probes 31 in the bin 3. In this condition, the control circuit may provide a prompt to the user to empty the waste bin 3, prevent machine operation to form a beverage, or take other suitable action.

By having the liquid level sensor provide a signal to the machine controller (e.g., that the waste bin should be emptied) when the fill volume is less than a total volume of the waste bin, the waste bin may be made capable of receiving a total beverage volume (or at least a large quantity of the volume) dispensed or leaked by the beverage forming station whenever the beverage machine operates to form a beverage. For example, if the conductive probes 31 are positioned at a level in the waste bin 3 such that the probes 31 contact liquid at a very low level in the bin 3, the machine 10 may only operate to form a beverage when the waste bin 3 is empty enough to collect the entire volume of beverage to be formed, or at least a large quantity of the volume of beverage to be formed. This way, the waste bin 3 can always collect all or most of the beverage volume in case of a machine failure (such as a leaking cartridge seal), user error (failing to place the carafe 2 at the carafe receiving area 12), or other condition.

Although in this embodiment the liquid level sensor includes a pair of conductive probes capable of contacting liquid in the waste bin 3 and providing a signal (e.g., a resistance change) indicative of liquid being present at the probes 31, the liquid level sensor may be arranged in other ways. For example, the sensor may include a microswitch with an attached float that rises with liquid level in the bin to activate the switch. In another embodiment, the liquid level sensor may detect a capacitance change associated with a liquid level in the bin 3, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration.

Figure 7:
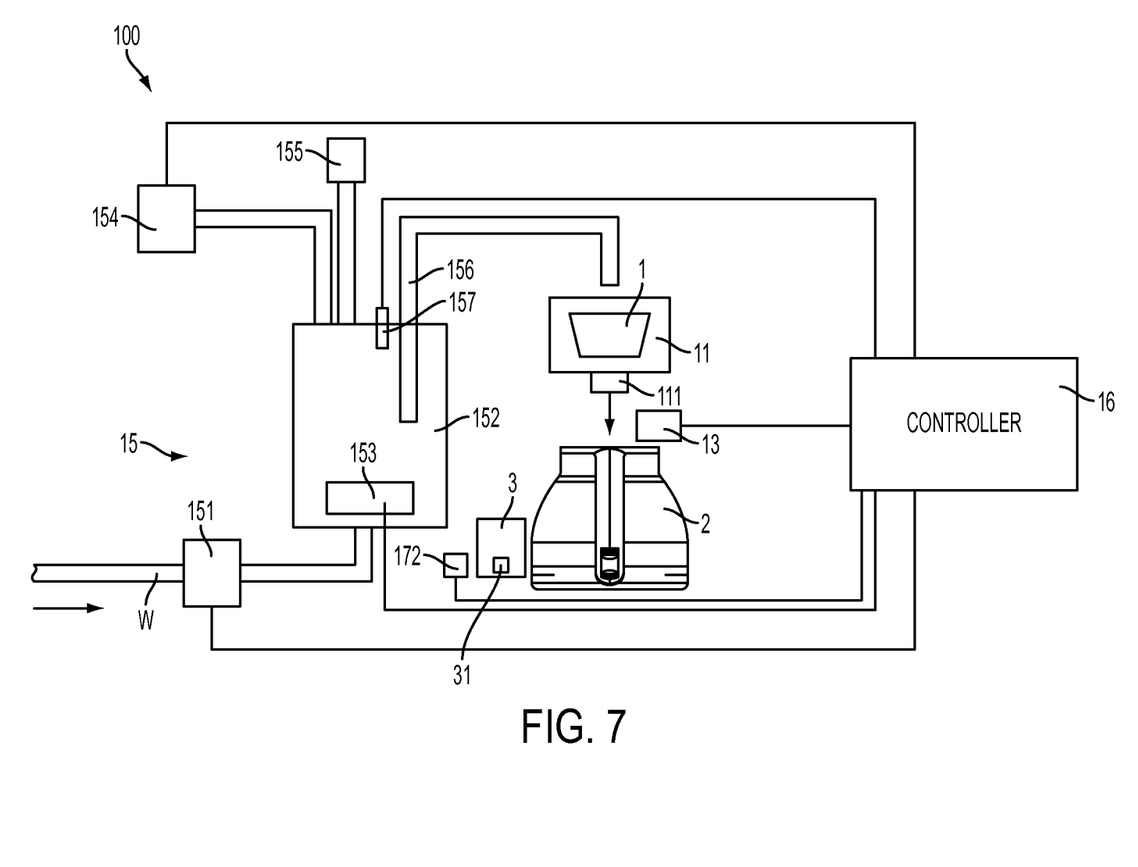
FIG. 7 a schematic diagram of components of a beverage forming apparatus in an illustrative embodiment.

FIG. 7 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2. The liquid supply 15 in this embodiment includes a valve 151 that is coupled to a source W that provides liquid from a storage tank, a mains water supply or other source. The valve 151 is controlled by a control circuit 16 to open and close to provide a desired volume of liquid to a tank 152. For example, if the tank 152 is empty, the valve 151 may be opened until a conductive probe or other water level sensor 157 provides a signal to the control circuit 16 that indicates when liquid arrives near or at a top of the tank 152. In response to detecting liquid at the sensor 157, the control circuit 16 may close the valve 151. Multiple sensors 157 may be provided at different heights in the tank 152 so that the tank 152 may be filled to different levels, allowing the liquid supply 15 to provide different volumes of liquid to the forming station 11. Of course, other arrangements for providing liquid to the tank 152 are possible, such as by a pump (e.g., a centrifugal pump, piston pump, solenoid pump, diaphragm pump, etc.), gravity feed, or other. Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the control circuit 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valve 151 for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. (Generally speaking, components of the liquid supply 15 that heat, cool, carbonate or otherwise condition liquid supplied to the beverage forming station 11 are referred to as a "liquid conditioner.") In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 above a bottom end of the conduit 156. Again, liquid may be caused to flow from the tank 152 to the beverage forming station 11, and the volume of liquid may be controlled, in other ways, such as by opening the valve 151 to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways, particularly where volume of liquid delivered to the forming station 11 is controlled in other ways. For example, the outlet of the heater tank 152 to the conduit 156 could be arranged at an extreme top of the tank 152. The conduit 156 may include a check valve or other flow controller, e.g., to help prevent backflow in the tank conduit 156 from the forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a carafe lid detector 13 that detects whether the carafe lid is in an open or closed position. The detector 13 may detect the presence or absence of the lid 24, and thus detect whether the lid 24 is in the open or closed position. If the lid 24 is detected to be in the closed position, the control circuit 24 may prevent the apparatus 100 from operating to dispense a beverage to the carafe 2. Note that the apparatus 100 need not necessarily be prevented from operating to produce a beverage if the carafe lid is detected to be closed or is not detected to be open. For example, the apparatus 100 may operate to produce a beverage and store the beverage in a holding tank if the carafe lid 24 is closed. If the carafe lid 24 is detected to be in the open position, the control circuit 16 may then control the apparatus 100 to dispense the stored beverage from the holding tank to the carafe 2. The lid detector 13 may include one or more Hall effect sensors, optical detectors, reed switches, microswitches that are closed by physical contact with the carafe lid, and/or other components to detect the presence or absence of the lid 24. The control circuitry 16 may be arranged to suitably interpret any type of signal provided by the detector 13 to determine the lid open/closed state.

The control circuit 16 may also communicate with the liquid level sensor 31 of the waste bin 3 via one or more contacts 172 on the housing 17 that connect with one or more contacts 34 on the waste bin 3. The liquid level sensor 31 may provide a signal, such as a resistance level, capacitance, current level, etc., that is received by the control circuit 16 and interpreted to represent whether liquid is at or above a certain threshold level in the waste bin 3 or not. For example, in this embodiment, the control circuit 16 may apply a voltage across the conductive probes 31 of the waste bin 3, and detect whether liquid is in contact with the probes 31 (the liquid may complete a circuit across the probes 31 that has a different resistance than when one or both probes 31 are out of contact with the liquid). As noted above, the control circuit 16 may receive information regarding the liquid level in the waste bin 3 in other ways, such as by detecting the closure of a switch of the liquid level sensor 31, detecting a change in capacitance, pressure or other characteristic of liquid in the waste bin, detecting a change in weight of the waste bin, etc. The control circuit 16 may also include a waste bin presence sensor, such as a microswitch, reed switch, etc., that detects the presence of the waste bin 3 at the receiving area 171, e.g., when the bin 3 contacts the microswitch, a magnet on the bin 3 closes the reed switch, etc. This may allow the control circuit 16 to confirm that the bin 3 is properly positioned, and may be a condition required to permit the machine 10 to form a beverage.

According to an aspect of the invention, a method for controlling a beverage forming apparatus may include providing a beverage forming apparatus having a waste bin that is removable from a beverage forming machine housing, with the waste bin having at least one electrically conductive contact in connection with a corresponding housing contact when the waste bin is received by the housing. The contacts may take any suitable form, such as blunt pieces of conductive metal, flat metal contact pads, spade connectors, and so on. The waste bin may include a liquid level sensor electrically connected to one or more contacts on the waste bin, and may communicate with a control circuit of the beverage forming machine via the one or more contacts.

A fill volume of liquid in the waste bin may be detected to be equal to or greater than a threshold volume (or not) based on a signal received via the at least one electrically conductive contact. For example, the liquid level sensor of the waste bin may provide a signal that indicates whether a liquid level in the bin is at or above a particular threshold level. In one embodiment, this may be done by employing conductive probes in the waste bin such that if a liquid level is below one or both probes, a relatively high resistance signal is provided, and if the liquid level is at or above the probes, a relatively low resistance signal is provided. Other arrangements are possible, such as the liquid level sensor providing a closed or open circuit signal (switch open/closed), a varying capacitance, voltage, pressure, etc.

If the fill volume is detected to be greater than or equal to the threshold volume, operation of the beverage forming apparatus to dispense a beverage may be prevented. For example, if a control circuit determines that a liquid level in the waste bin is above a threshold level, the control circuit may prevent the liquid supply from delivering liquid to the beverage forming station. In addition, the control circuit may display a prompt (such as a visual text message on a display screen, an audible text message, a flashing light, etc.) to alert the user that the waste bin should be emptied. In some embodiments, the threshold level may be at or below a level in the waste bin that permits the waste bin to collect a maximum volume of a beverage to be produced by the beverage machine. This way, the waste bin may be always ready to collect all or most of a volume of beverage produced by the machine if necessary.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus comprising:
a housing to support components of the beverage forming apparatus, the housing having a waste bin receiving area;
a beverage forming station supported by the housing and arranged to combine a precursor liquid with a beverage material to form a beverage that is dispensed via a dispense outlet at a dispense area;
a precursor liquid supply system supported by the housing for providing precursor liquid to the beverage forming station;
a waste bin positioned away from the dispense outlet and arranged to collect waste liquid released from the beverage forming station other than from the dispense outlet, the waste bin including a liquid level sensor to detect a liquid level in the waste bin and at least one electrically conductive contact arranged to connect with a corresponding housing contact with the waste bin positioned at the waste bin receiving area, the waste bin being removable from the waste bin receiving area of the housing; wherein the beverage forming station includes a cartridge holder, and the waste bin is arranged to receive liquid expelled from the cartridge holder or a cartridge in the cartridge holder; and
a control circuit arranged to control the liquid supply system to deliver precursor liquid to the beverage forming station to dispense a beverage only when a signal received from the liquid level sensor via the at least one electrically conductive contact indicates that a liquid level in the waste bin is below a threshold level.

2. The apparatus of claim 1, wherein the waste bin is arranged to collect liquid that leaks from the beverage forming station.

3. The apparatus of claim 2, wherein the housing has a front side at which the dispense area is located, and wherein the waste bin receiving area is located behind the dispense area.

4. The apparatus of claim 1, further comprising a carafe positionable at the dispense area and arranged to receive beverage dispensed by the beverage forming station from the dispense outlet.

5. The apparatus of claim 4, wherein the dispense area and the waste bin receiving area are located below the beverage forming station.

6. The apparatus of claim 1, wherein the at least one electrically conductive contact includes a pair of electrically conductive contacts that are electrically insulated from each other, and wherein the liquid level sensor includes a pair of conductive probes each connected to a respective electrically conductive contact, the conductive probes arranged to contact liquid in the waste bin.

7. The apparatus of claim 6, wherein the conductive probes are arranged to contact liquid in the waste bin and provide an electrical signal to the control circuit via the electrically conductive contacts.

8. The apparatus of claim 7, wherein the waste bin has a total volume and at least one of the conductive probes is located within the interior space at a location corresponding to a fill volume of the waste bin that is less than the total volume by an amount equal to or greater than a maximum beverage dispense volume of the apparatus.

9. A method for controlling a beverage forming apparatus, comprising:
providing a beverage forming apparatus having a waste bin that is removable from a beverage forming apparatus housing, the waste bin having at least one electrically conductive contact in connection with a corresponding housing contact with the waste bin received by the housing; wherein the beverage forming apparatus has a beverage forming station with a cartridge holder; collecting liquid that leaks from the beverage forming station separate from a dispense outlet of the beverage forming station in the waste bin;
detecting whether a fill volume of liquid in the waste bin is equal to or greater than a threshold volume based on a signal received via the at least one electrically conductive contact; and
preventing operation of the beverage forming apparatus to dispense a beverage if the fill volume is detected to be greater than or equal to the threshold volume.

10. The method of claim 9, further comprising removing the waste bin from the housing to disconnect the at least one electrically conductive contact from the housing contact.

11. The method of claim 9, wherein the beverage forming apparatus has a dispense area below a dispense outlet from which beverage is dispensed, the method further comprising collecting liquid below the dispense outlet in the waste bin.

12. The method of claim 9, wherein the at least one electrically conductive contact includes a pair of electrically conductive contacts that are electrically insulated from each other, and wherein each electrically conductive contact is electrically connected to a conductive probe that is located within an interior space of the waste bin.

13. The method of claim 12, wherein the step of detecting includes detecting whether the conductive probes are in contact with liquid in the waste bin.

14. The method of claim 9, wherein the threshold volume is less than a total volume of the waste bin.

15. The method of claim 14, wherein the threshold volume is less than the total volume by an amount equal to or less than a maximum beverage dispense volume of the beverage forming apparatus.

16. The method of claim 14, wherein the step of preventing includes preventing operation of the beverage forming apparatus to dispense a beverage unless the waste bin is detected to be located at a waste bin receiving area.

* * * * *